United States Patent
Cronin

(10) Patent No.: US 9,075,508 B1
(45) Date of Patent: Jul. 7, 2015

(54) NEXT APPLICATION SUGGESTIONS ON A USER DEVICE

(71) Applicant: OTO Technologies LLC, Charleston, SC (US)

(72) Inventor: John Cronin, Bonita Springs, FL (US)

(73) Assignee: GrandiOs Technologies, LLC, Wilmington, DE (US)

( * ) Notice: Subject to any disclaimer, the term of this patent is extended or adjusted under 35 U.S.C. 154(b) by 0 days.

(21) Appl. No.: 14/265,728

(22) Filed: Apr. 30, 2014

(51) Int. Cl.
*G06F 3/0482* (2013.01)
*G06F 3/0481* (2013.01)
G06F 3/023 (2006.01)
G06F 9/44 (2006.01)
H04L 29/08 (2006.01)

(52) U.S. Cl.
CPC .......... *G06F 3/0482* (2013.01); *G06F 3/04817* (2013.01); *G06F 3/0237* (2013.01); *G06F 3/0236* (2013.01); *G06F 3/0481* (2013.01); G06F 9/4443 (2013.01); H04L 29/08081 (2013.01)

(58) Field of Classification Search
CPC ... G06F 3/0237; G06F 3/0482; G06F 3/0236; G06F 3/0481; G06F 9/4443; H04L 29/08081
USPC .................. 715/812, 810, 825, 826; 709/217
See application file for complete search history.

(56) References Cited

U.S. PATENT DOCUMENTS

| | | | |
|---|---|---|---|
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |

(Continued)

FOREIGN PATENT DOCUMENTS

| | | |
|---|---|---|
| DE | 10 2014 100 081 | 7/2014 |
| EP | 2 706 730 | 3/2014 |

OTHER PUBLICATIONS

"How to create advanced actions in Launch Center Pro for iPhone and iPad", by Periscop Post Feb. 19, 2014.

(Continued)

*Primary Examiner* — Omar Abdul-Ali
*Assistant Examiner* — Mong-Shune Chung
(74) *Attorney, Agent, or Firm* — Lewis Roca Rothgerber LLP

(57) ABSTRACT

Methods and systems are presented for providing suggested next applications to open after a first application is opened on a user device (e.g., a mobile device). A list of next application suggestions may be generated based on past applications successively opened after respective openings of the first application. The list of next application suggestions may also be generated based on retrieved, shared data and third party data. The list of next application suggestions may be displayed on a user interface while first application is running, so that the user may select a next application to run without needing to return to a home or multi-tasking screen.

19 Claims, 7 Drawing Sheets

(56) References Cited

U.S. PATENT DOCUMENTS

| | | | |
|---|---|---|---|
| 8,843,158 B2 | 9/2014 | Nagaraj | |
| 8,849,308 B2 | 9/2014 | Marti et al. | |
| 8,862,060 B2 | 10/2014 | Mayor et al. | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2010/0146442 A1* | 6/2010 | Nagasaka et al. | 715/810 |
| 2010/0325122 A1* | 12/2010 | Yassin | 707/759 |
| 2011/0093580 A1* | 4/2011 | Nagasaka et al. | 709/223 |
| 2011/0161878 A1 | 6/2011 | Stallings et al. | |
| 2013/0303192 A1 | 11/2013 | Louboutin | |
| 2013/0317835 A1 | 11/2013 | Mathew | |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |

OTHER PUBLICATIONS

"Launch Center Pro on the App Store on iTunes", by Contrast, iTunes Preview. Feb. 11, 2014.

* cited by examiner

NEXT APPLICATION SUGGESTIONS ON A USER DEVICE

BACKGROUND OF THE INVENTION

1. Field of the Invention

The present invention generally concerns applications on a user device. More particularly, the present invention concerns suggesting next applications to open on a user device.

2. Description of the Related Art

Applications on a typical user device (e.g., mobile phone) may be activated, moved, and deleted. In order to switch between applications, a user may be required to return to the home-screen or may be limited to using only multi-tasking applications. For example, when running an application on a mobile device, depressing an electromechanical button may return the display to the home screen, from which the user may select a different application to open. Thus, although a next application to open might be logical, relative to the first opened application, it is inefficient and time-consuming to navigate the operating system in order to find and open the next application. A user may gather certain applications together in one of many home screens (or groups or folders therein), but this does not remedy the need to return to the home screen after opening a first application and before opening a next application.

Existing user devices, operating systems, and applications do not, however, provide suggestions for next applications to open nor the functionality to open suggested applications while running another application. There exists a need to provide suggested next applications to open after a first application based on frequency of use, shared application data, and third party data.

SUMMARY OF THE CLAIMED INVENTION

Methods and systems are presented for providing suggested next applications to open after a first application is opened on a user device (e.g., a mobile device). A list of next application suggestions may be generated based on past applications successively opened after respective openings of the first application. The list of next application suggestions may also be generated based on retrieved, shared data and third party data. The list of next application suggestions may be displayed on a user interface while first application is running, so that the user may select a next application to run without needing to return to a home or multi-tasking screen.

Various embodiments may include methods for displaying next application suggestions on a user device. Such methods may include opening a first application in response to user input received at a user interface of the user device, wherein the first application runs on the user device. The method further includes retrieving next application data associated with the first application, the next application data stored in memory and including a list of one or more next applications, wherein each of the one or more next applications was opened on the user device immediately following a respective previous opening of the first application. The method further includes generating a list of suggested applications based on the next application data, the list of suggested applications including one or more of next applications, and displaying the list of suggested applications on the user interface, wherein each displayed suggested application is selectable by the user.

Various embodiments may further include systems for providing reading assistance by a persona assistant. Such systems may include a user interface that receives user input, a memory that stores instructions, and a processor that executes the instructions stored in the memory. The processor may execute the instructions to open a first application in response to the received user input received, wherein the first application runs on the user device, and retrieve next application data associated with the first application. The next application data is stored in memory and includes a list of one or more next applications, wherein each of the one or more next applications was opened on the user device immediately following a respective previous opening of the first application. The processor may further execute instructions to generate a list of suggested applications based on the next application data and display the list of suggested applications on the user interface, wherein each displayed suggested application is selectable by the user.

Embodiments of the present invention may further include non-transitory computer-readable storage media, having embodied thereon a program executable by a processor to perform methods for displaying next application suggestions on a user device as described herein.

DETAILED DESCRIPTION

Methods and systems are presented for providing suggestions for next applications to open on a user device (e.g., mobile phone) according to recorded use patterns. In some embodiments, when a user opens an application on a user device, auto suggest software will display suggested applications to be opened next by the user based on the open application. Auto suggest software may be an application loaded onto the user device by the user, or any combination of software, firmware, and hardware that is incorporated into the user device. An auto suggest software application on a user device can provide next application suggestions based on next application data stored locally on the user device and/or data accessed through a network.

Figure 1:
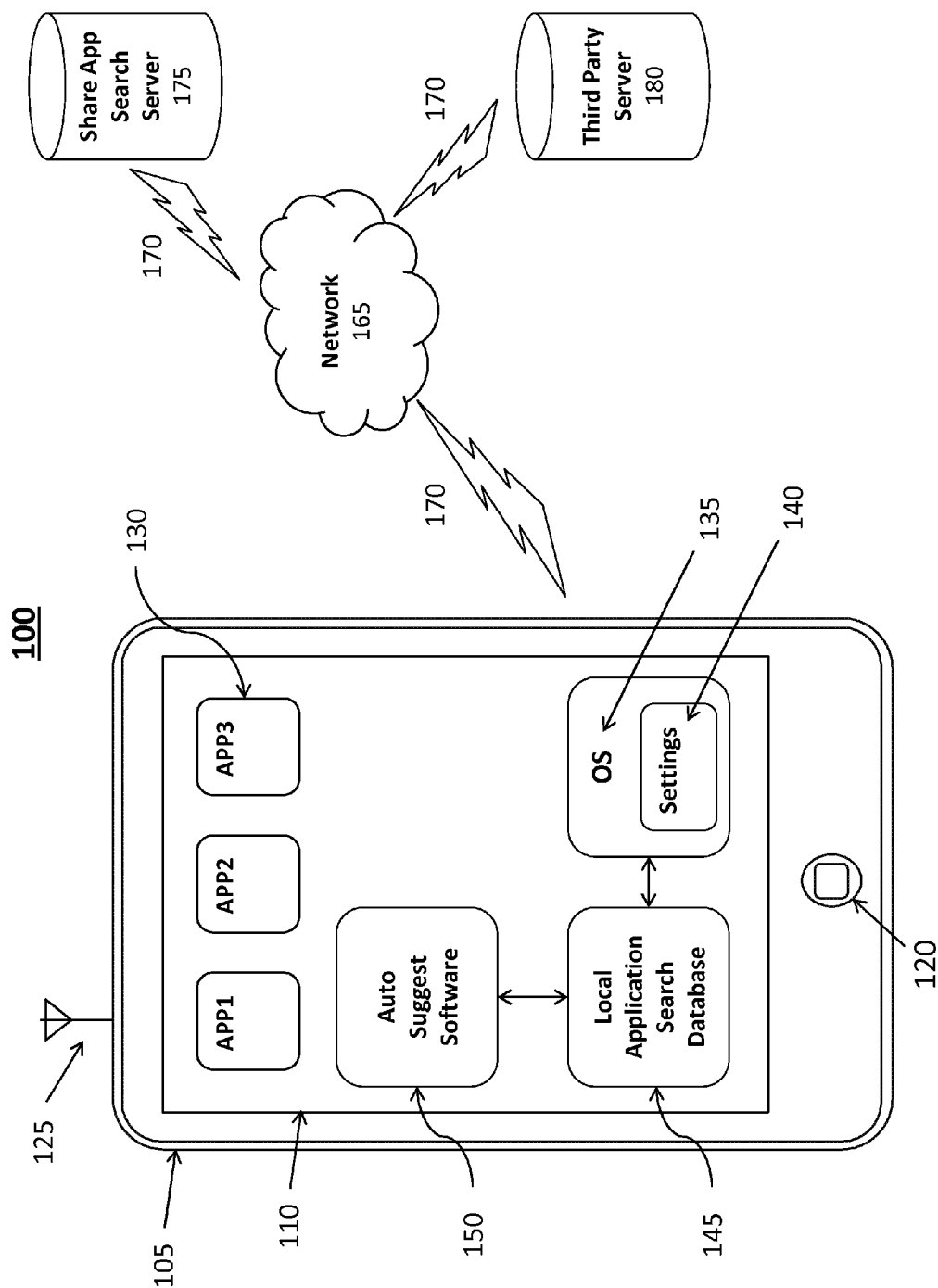
FIG. 1 illustrates an exemplary network environment in which a system for providing next application suggestions on a user device may be implemented.

FIG. 1 illustrates an exemplary network environment 100 in which a system for displaying next application suggestions on a user device may be implemented. Network environment 100 may include user device 105, network 165, network connections 170, share application search server 175 ("share app search server"), and third party server 180. Any combination of the components illustrated in network environment 100, including user device 105, network 165, network connections 170, share app search server 175, third party server 180, and modules, processes, or subsystems of each, and any other hardware, software, or both, for implementing the features described in the present disclosure may be collectively referred to, herein, as "the system."

User device 105 may be any number of different electronic user devices 105, such as general purpose computers, mobile phones, smartphones, personal digital assistants (PDAs), portable computing devices (e.g., laptop, netbook, tablet), desktop computing devices, handheld computing device, or any other type of computing device capable of communicating over network 165. User devices 105 may also be configured to access data from other storage media, such as memory cards or disk drives as may be appropriate in the case of downloaded services. User device 105 may include standard hardware computing components, including, for example, network and media interfaces, non-transitory computer-readable storage (memory), and processors for executing instructions that may be stored in memory.

In the illustrated embodiment, user device 105 (e.g., mobile phone) includes display 110. In some implementations, display 110 may be a touchscreen display. In some implementations, display 110 is a user interface. As shown in the illustrated embodiment, display 110 may display icons corresponding to applications 130 (e.g., APP1, APP2, and APP3). Display 110 may include any suitable soft keys. It will be understood that user device 105 may include other elements not shown, for example, a microphone, camera, speaker, or any other suitable hardware or software elements.

User device 105 may include an operating system 135. Operating system 135 may be software that manages the use of hardware, computer programs, and applications of user device 105. Operating system 135 may be, for example, Windows, iOS, OS X, Android, UNIX, or Linux. User device 105 may additionally include settings 140, which may include configurable components of operating system 135. Settings 140 may be modifiable by a user of the user device to alter the performance of operating system 135 and other software on user device 105. In some embodiments, settings 140 may be an application on the user device 105, by which a user may select options and preferences and configures operating system functions. In an example, operating system 135 of user device 105 (e.g., an Apple device) may be iOS, and the settings 140 of user device 105 may be iOS settings. In another example, operating system 135 may be LINUX, and the settings 140 may be LINUX configuration files. In some embodiments, settings 140 may include auto suggest settings, which are modifiable by a user to alter the performance of auto suggest software 150. In some embodiments, settings 140 may be modifiable by a user to configure access to and/or sharing of data with share app search server 175 and third party server 180.

User device 105 may include any suitable software or applications. In some embodiments, auto suggest software 150 runs on user device 105. Auto suggest software 150 may be software capable of providing next application suggestions based on, for example, user input, user settings 140, locally stored information (e.g., local application search database 145) and information accessible over a network (e.g., network 165) from various sources.

In some embodiments, auto suggest software 150 is an application running on user device 105. Auto suggest software 150 may, for example, monitor use of applications 130 on user device 105, provide a list of next suggested applications, retrieve data locally or remotely, or perform any other suitable actions related to suggestion of next applications. In some embodiments, depressing electromechanical button 120 may activate auto suggest software 150. For example, depressing electromechanical button 120 three times in succession may activate auto suggest software 150. In some embodiments, actuating a soft key 140 may turn auto suggest software 150 ON or OFF.

Local application search database 145 may be any suitable database capable of storing data on user device 105. Local application search database 145 may store next application suggestion data, which may include, for example, information related to applications opened after a particular application is opened (e.g., next applications), how many times each next application is opened after a particular application, and user preference information relating to next applications. In some embodiments, local application search database 145 may be implemented as part of auto suggest software 150. In some embodiments, local application search database 145 may be implemented on a device separate from user device 105 and be accessible by network 165.

Applications 130 are software modules on user device 105, which may be downloaded from remote servers. Applications 130 may provide additional functions for user device 105. For example, applications 130 may be any suitable applications downloaded from, for example, Apple Inc.'s APP STORE® (for Apple devices), GOOGLE PLAY® (for Google Android devices), or any other suitable database or server. In some embodiments, applications 130 may be software, firmware, or hardware that is integrated into the user device 105.

Antenna 125 is a component of user device 105. In some embodiments, user device 105 may use antenna 125 to send and receive information wirelessly. For example, antenna 125 may be a cellular data antenna, Wi-Fi antenna, or BLUETOOTH® antenna.

Network connections 170 may include any suitable wired or wireless transmission mediums or channels through which data may be communicated between user device 105, network 165, and third party network 180, and share application search server 175. Network connections may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 165 may include the Internet, a system of interconnected computer networks that use a standard protocol, a dispersed network of computers and servers, a local network, a public or private intranet, any other coupled computing systems, or any combination thereof. In some embodiments, network 165 may be a cloud, which is a network of remote servers hosted on the Internet and used to store, manage, and process data in place of local servers or personal computers. User device 105 may be coupled to network 165 though any suitable wired or wireless connection. In some embodiments, user device 105 may be coupled to network 165 via network connections 170.

Network 165 may allow for communication between the user device 105, share app search server 175, and third party server 180 via various communication paths or channels. Such paths or channels may include any type of data communication link known in the art, including TCP/IP connections and Internet connections via Wi-Fi, Bluetooth, a Universal Mobile Telecommunications System (UMTS) network, or any other suitable data communication link. In that regard, network 165 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 165 allows for communication between any of the various components of network environment 100.

Share app search server 175 may, in some embodiments, store next application data. In some embodiments, local app search database 145 may share data with share app search server 175. In some embodiments, share app search server 175 may be coupled to network 165 by network communications 170. Share app search server 175 is accessible by other devices through network 165. It will be understood that FIG. 1 depicts a single share app search server 175 for purposes of brevity and clarity and that any suitable number of share app search servers 175 may be coupled to network 165 via network connections 170.

In some embodiments, third party server 180 may store next application data, retrievable by user device 105 over network 165. In some embodiments, third party server 180 may be coupled to network 165 by network communications 170. Third party server 180 is accessible by other devices through network 165. In some embodiments, user device 105 may load to or share with share app search server 175. It will be understood that FIG. 1 depicts a single third party server 180 for purposes of brevity and clarity and that any suitable number of third party servers 180 may be coupled to network 165 via network connections 170.

Single share app search server 175 and third party server 180 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Figure 2:
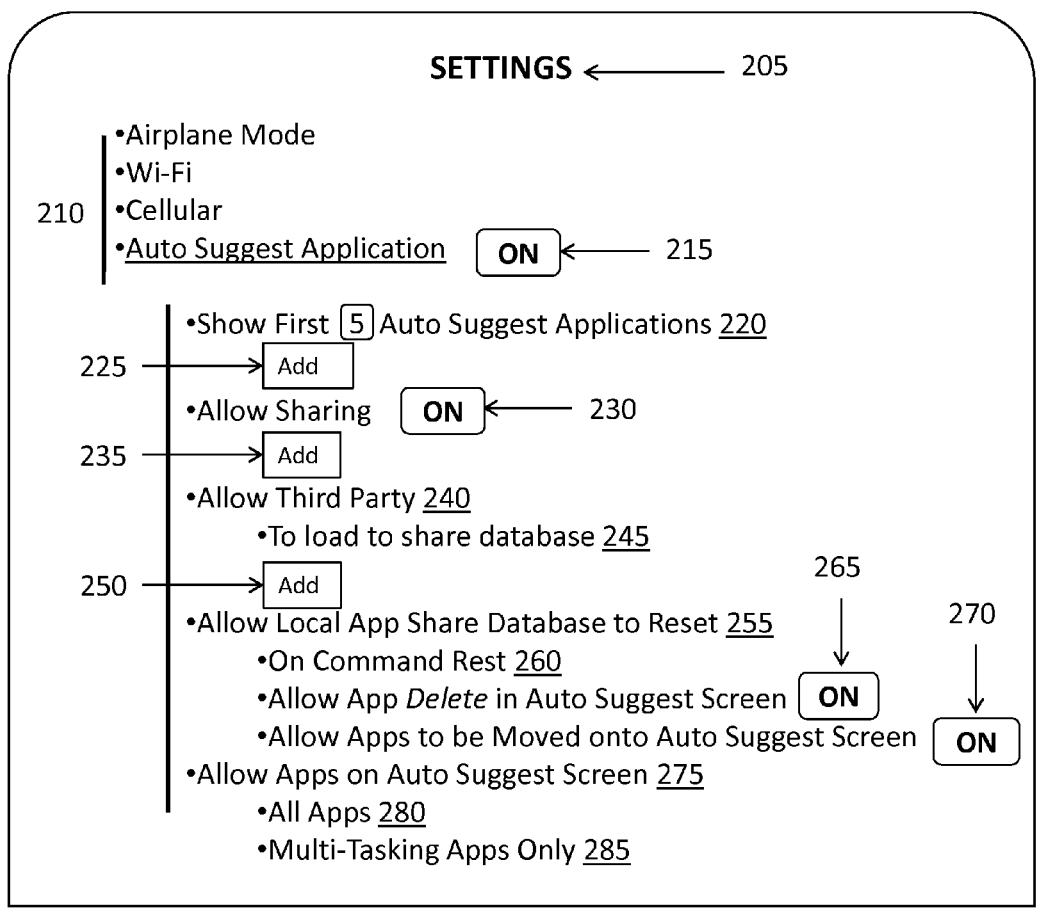
FIG. 2 is a diagram illustrating exemplary settings of an operating system on a user device that may be used with a system for providing next application suggestions.

FIG. 2 is a diagram illustrating exemplary settings 200 of an operating system on a user device that may be used with a system for providing next application suggestions. In some embodiments, settings 200 may be displayed on a display screen of user device 105 of FIG. 1. Settings 200 may, for example, provide a mechanism by which a user may alter the functions of an operating system of a user device by implementing changes to settings. User interface 200 may facilitate user interaction with a user device.

User interface 200 may include settings menu 205. Settings menu 205 may include user-editable features for customizing the functionality of an operating system or user device according to user preferences. In some implementations, settings of operating system 135 of FIG. 1 may be modified by the user interacting with options or commands in a respective settings menu 205. Settings menu 205 may include any number of user-selectable options or commands. Settings menu 205 may include any suitable number of standard operating system or user device settings, for example, standard settings 210, including airplane mode, Wi-Fi, and cellular, as shown in FIG. 2. Standard settings 210 are exemplary interface elements that, when selected by a user, may, for example, redirect the user to a respective new page, window, or dialogue box. For example, in the embodiment shown, the general settings element is shown as underlined and selected in FIG. 2.

In some embodiments, settings menu 205 includes a list of user-selectable options or settings presented in a hierarchical order. For example, auto suggest application settings 215 may be sub-settings under standard settings 210. Standard settings 210 may include auto suggest application settings 215, which is shown as selected (e.g., underlined) in FIG. 2, and the selection of auto suggest application settings 215 may reveal auto suggest settings 220-285. Auto suggest application settings 215 include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, the auto suggest application settings 215 may include user-editable features for customizing the functionality of an auto suggest application running on a user device. In some embodiments, auto suggest application settings 215 may be used to customize the functionality of auto suggest software 150 of FIG. 1. As illustrated in FIG. 2, auto suggest application settings 215 may include a mechanism for selection and de-selection of auto suggest settings. In the illustrated embodiment, on/off selection buttons represent examples of mechanisms for selection and de-selection of personal assistant settings. In some embodiments, selection and de-selection in settings menu 205 are binary selections.

In some embodiments, auto suggest application settings 215 includes a sub-menu of auto suggest settings 220-285, which are user-selectable options or commands for determining the functionality of auto suggest software running on the user device. The auto suggest application settings 215 may include any suitable number of selectable auto suggest settings 220-285, including, for example, show first '5' auto suggest applications 220, allow sharing 230, allow third party 240, allow local app share database to reset 225, and allow apps on auto suggest screen 275, as shown in FIG. 2. In the illustrated embodiment, auto suggest application settings 215 is selected to be "ON," indicating the feature is activated.

In the illustrated embodiment, exemplary auto suggest settings 220-285 are shown. Show first '5' auto suggest applications 220 allows a user to configure the number of auto suggest applications (e.g., suggested next applications) to be displayed for selection on the user device. Add 225 may be used to add applications to be shown as suggested next applications. Allow sharing 230 is shown to be "ON." In some embodiments, a user may permit or deny sharing of next application data stored on the user device with allow sharing 230. For example, the user may allow next application data stored on local application search database 145 to be shared with share app search server 175 and/or third party server 180 of FIG. 1. Add 235 may be selected to add servers or databases with which to share data. In some embodiments, a user may permit or deny use of a third party server or database with allow third party 240. To load to share database 245 is shown as a sub-option, which may be used to allow or disallow a third party to load data or applications to share database 245. Add 250 may be selected to add third party databases or servers for use.

Allow local app share database to reset 255 may be used to configure reset options for auto suggest software (e.g., auto suggest software 150 of FIG. 1). Sub-options include on command rest 260, allow app delete in auto suggest screen 265, which is shown as "ON," and allow apps to be moved onto auto suggest screen, which is also shown as "ON."

Allow apps on auto suggest screen 275 may be used to allow or disallow applications on the auto suggest screen. Sub-options include all apps 280 and multi-tasking apps only 285.

Figure 3:
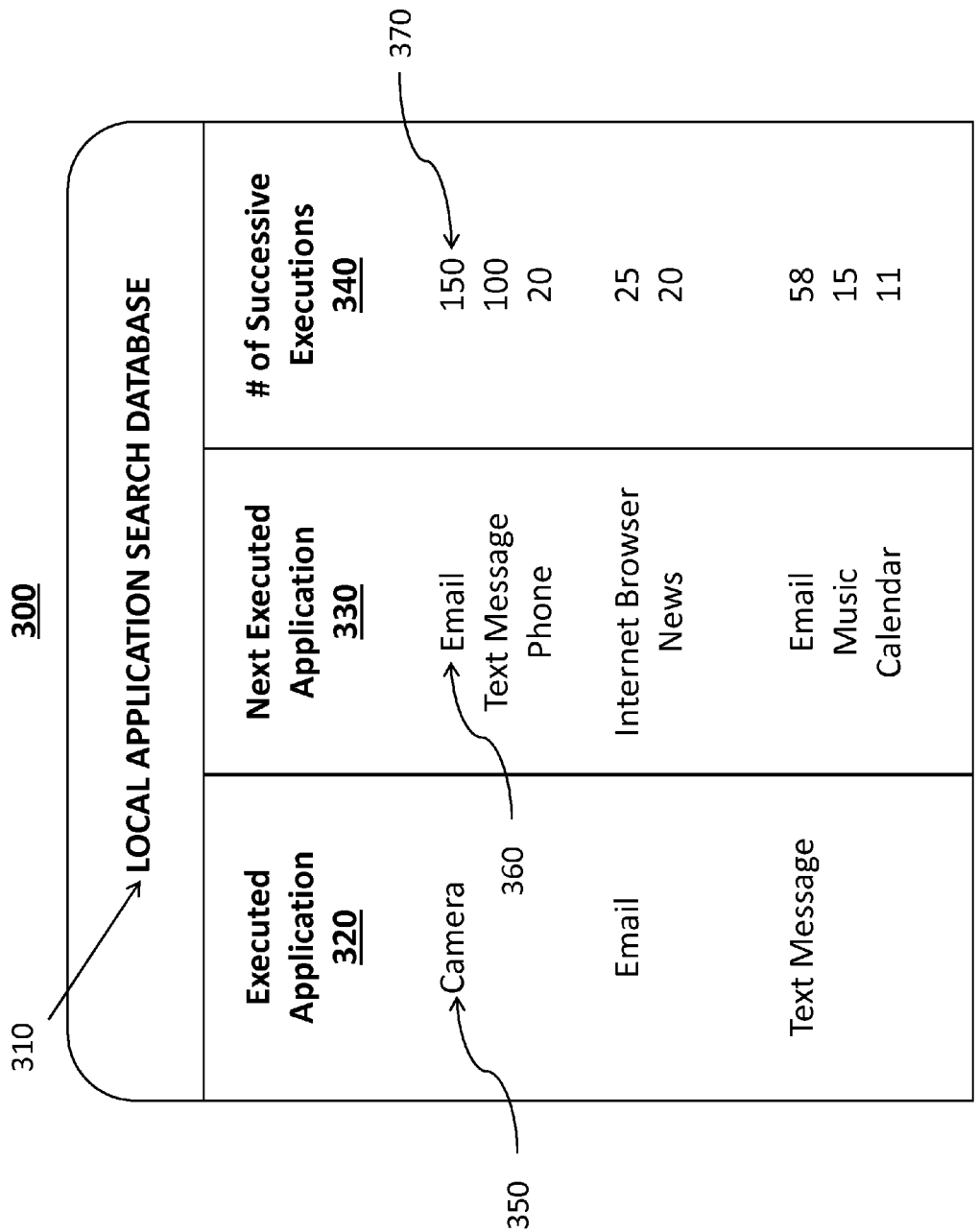
FIG. 3 illustrates an exemplary local application search database for maintaining counts of executed and next executed applications on a user device.

FIG. 3 illustrates an exemplary local application search database 310 for maintaining counts of executed and next executed applications on a user device. In some embodiments, exemplary local application search database 310 may correspond to local application search database 145 of FIG. 1.

In the illustrated embodiment, local application search database 310 is shown to include executed application column 320, next executed application column 330, and number (#) of successive executions column 340. As shown in FIG. 3, local application search database 310 maintains a record of next executed applications 330, relative to executed applications 320, and how many times each next executed application 330 is executed successive to executed applications 320 (e.g., # of successive executions 340). For example, executed application 320 may be camera application 350, and next executed applications 330 include email application 360, text message application, and phone application. In the example, email 360 is the most frequently executed next executed application 330 for camera application 350, with 150 successive executions 370.

Figure 4:
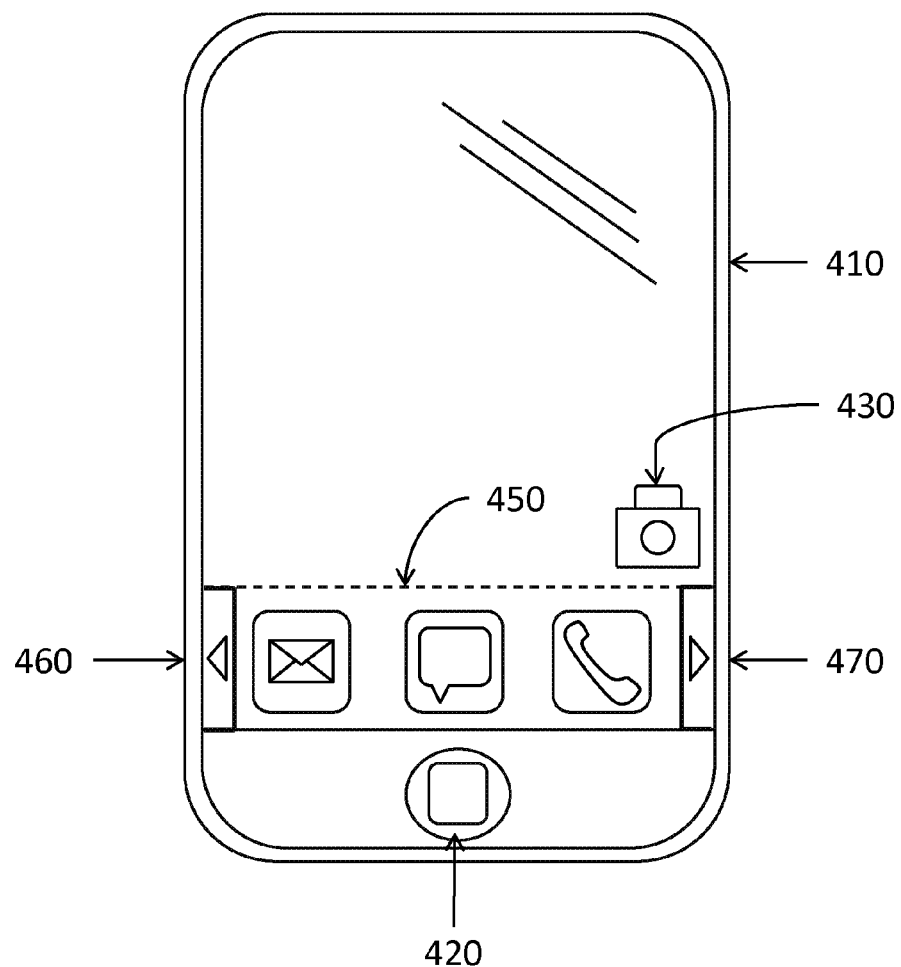
FIG. 4 is an exemplary user interface for providing next applications suggestions on a user device.

FIG. 4 is an exemplary user interface 400 for providing next application suggestions on a user device. In some embodiments, user interface 400 is implemented on user device 410, which may correspond to user device 105 of FIG. 1. User device 410 includes electromechanical button 420, which may correspond to electromechanical button 120 of FIG. 1, and which may be used to activate auto suggest software on user device 410. In the shown embodiment, auto suggest software is activated on user device 410, and camera application 430 is shown as currently executed. Toolbar 450 is shown as displaying three exemplary next application suggestions (email, text message, and phone), and soft keys 460 and 470 may be used to scroll the display of toolbar 450 left and right to display more or different suggested next applications. As described above in connection with FIG. 2, the number of displayed next application suggestions may depend on user settings.

Figure 5:
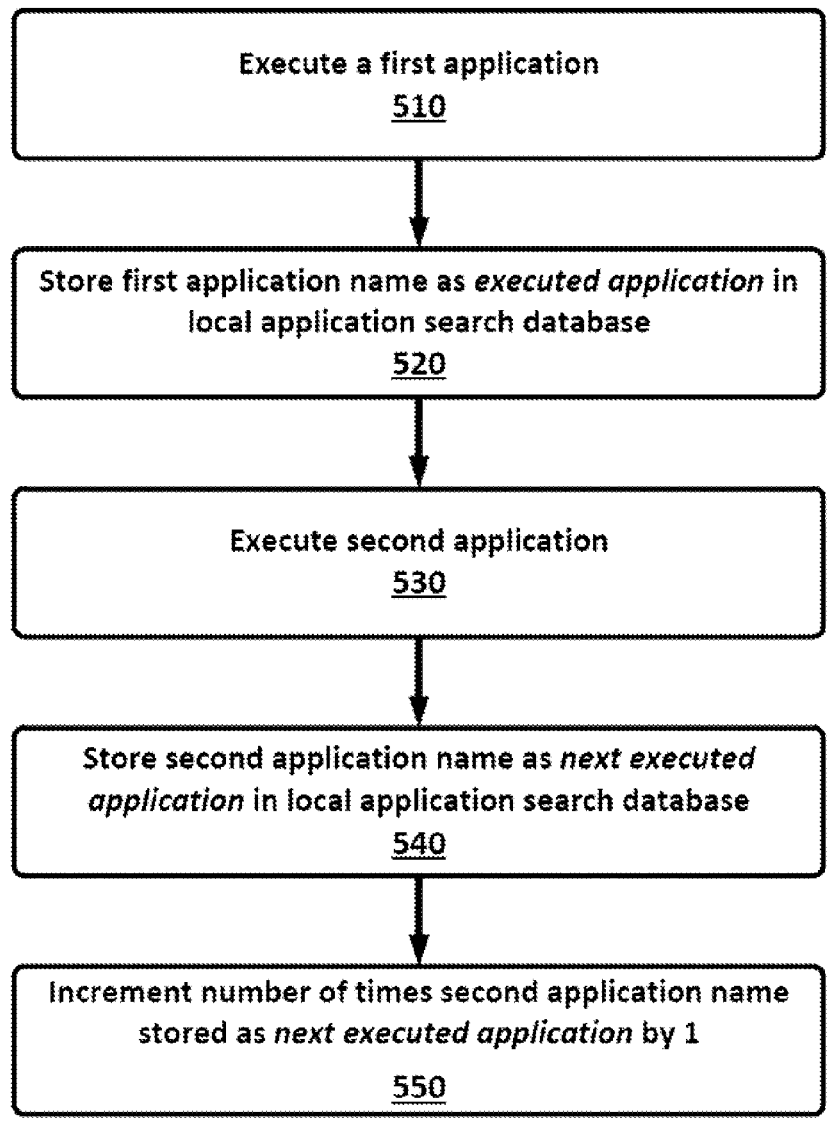
FIG. 5 is a flowchart illustrating an exemplary method for maintaining counts of executed and next executed applications on a user device.

FIG. 5 is a flowchart illustrating an exemplary method 500 for maintaining counts of executed and next executed applications on a user device.

In step 510, the system activates first application.

In step 520, the system stores the activated first application name as an executed application in, for example, local application search database 145 of FIG. 1. In some embodiments, the first application name may be stored as an executed application 320 of FIG. 3. For example, the first application may be camera application 430 of FIG. 4, shown as camera application 350 stored in local application search database 310 of FIG. 3.

In step 530, the system activates a second application. In some embodiments, the second application may correspond to a next application (e.g., a successively activated application).

In step 540, the system stores the activated second application name as an executed application in, for example, local application search database 145 of FIG. 1. In some embodiments, the second application name may be stored as a next executed application 330 of FIG. 3. For example, the next application activated may be email application 360 stored in local application search database 310 of FIG. 3.

In step 550, the system increments the number of times the second application name is stored as next executed application by '1.' For example, for email application 360, shown in next executed application 330, the '150' successive executions 370 may be incremented to '151' in # of successive executions 340. In some embodiments, the system may determine that the second application has not yet been successively activated after the first application (e.g., the executed application), and the system may set number of successive executions to '1.'

Figure 6:
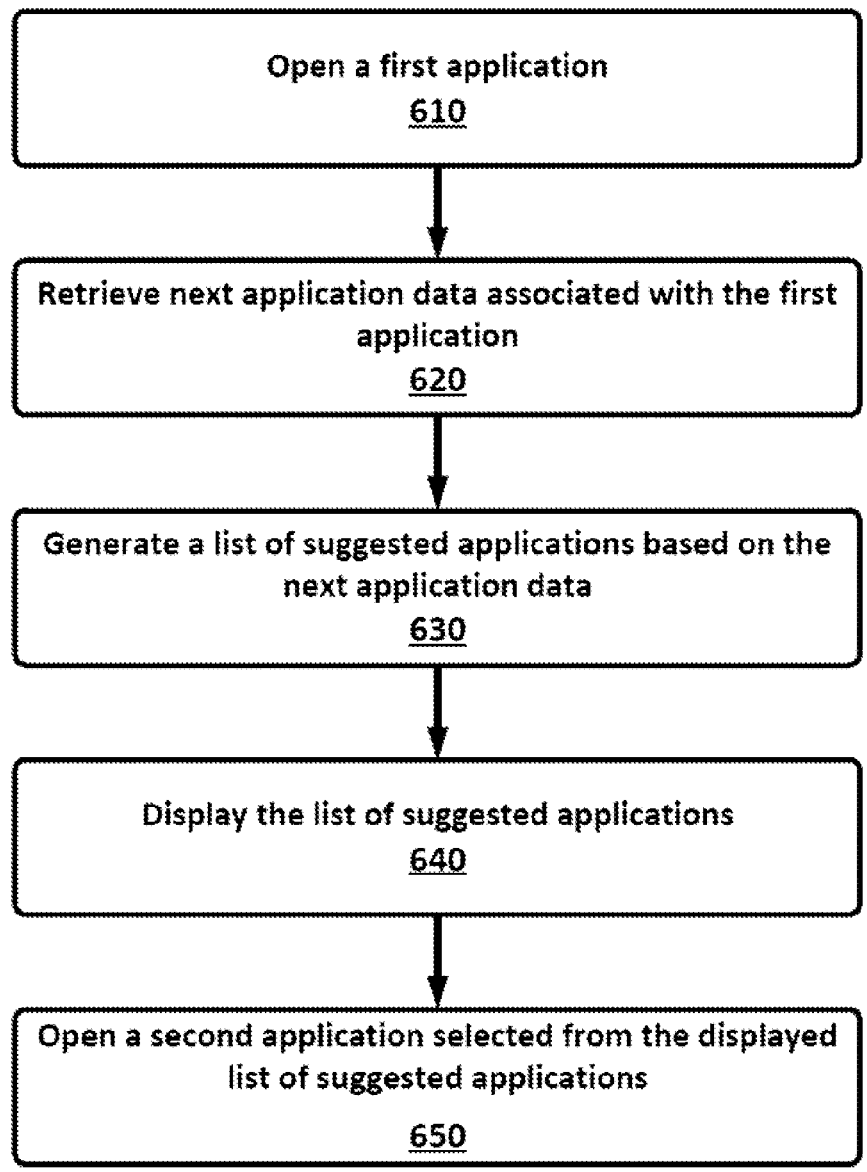
FIG. 6 is a flowchart illustrating an exemplary method for providing next application suggestions on a user device.

FIG. 6 is a flowchart illustrating an exemplary method 600 for providing next application suggestions on a user device.

In step 610, the system opens a first application in response to user input received at a user interface of the user device, wherein the first application runs on the user device. In some embodiments, step 610 may correspond to step 510 of FIG. 5.

In step 620, the system retrieves next application data associated with the first application. In some embodiments, the system retrieves next application data from local application search database 145, share app search server 175, and/or third party server 180. In some embodiments, the system retrieves next application data associated with the first application, the next application data stored in memory and including a list of one or more next applications, where each of the one or more next applications was opened on the user device immediately following a respective previous opening of the first application.

In step 630, the system generates a list of suggested applications based on the next application data. In some embodiments, the list of suggested applications generated may be based on the next application data retrieved in step 620. In some embodiments, the number of applications in the list of suggest applications may depend on user settings, as described above in connection with FIG. 2. Also as described above in connection with FIG. 2, the user may add applications to be included in the list of suggested next applications generated for the open first application. In some embodiments, the list of suggested applications may include a number of next executed applications that have been successively executed, relative to the open first application, most frequently. In some embodiments, the generated list of suggested applications is ranked, the ranking based on the count of each of the one or more next applications. For example, the list of suggested applications may include, for example, next executed applications 330 associated with high recorded #s of successive execution 340 of FIG. 3.

In step 640, the system displays the list of suggested applications. In some embodiments, the list of suggested applications may be displayed in any suitable manner on a display of a user device, for example user device 105 and display 110 of FIG. 1. For example, the system may display the list of suggested applications in toolbar 450 of FIG. 4. In some embodiments, the list of suggested applications displayed may depend on the ranking discussed above in connection with step 630. In some embodiments, the first application opened in step 610 may run on the display or user interface, while the list of suggested applications may be displayed concurrently, without interfering with the performance of the first application. In some embodiments, the list of suggested next applications displayed may depend on user settings, for example user settings 140 of FIG. 1. For example, as described above in connection with FIG. 2, the displayed list of suggested applications may, depending on auto suggest settings, include all apps 280 or multi-tasking apps only 285. In some embodiments, the list of suggested applications may be displayed as user-selectable icons or links. In some embodiments, a user may add applications to the displayed list of suggested applications by moving or dragging an icon onto the display or by selecting a user setting, as described above in connection with FIG. 2.

In step 650, the system opens a second application selected from the displayed list of suggested applications in response to user input received at the user interface, where the second application is a suggested application, and the user input includes selecting the second application from the displayed list of suggested applications.

Figure 7:
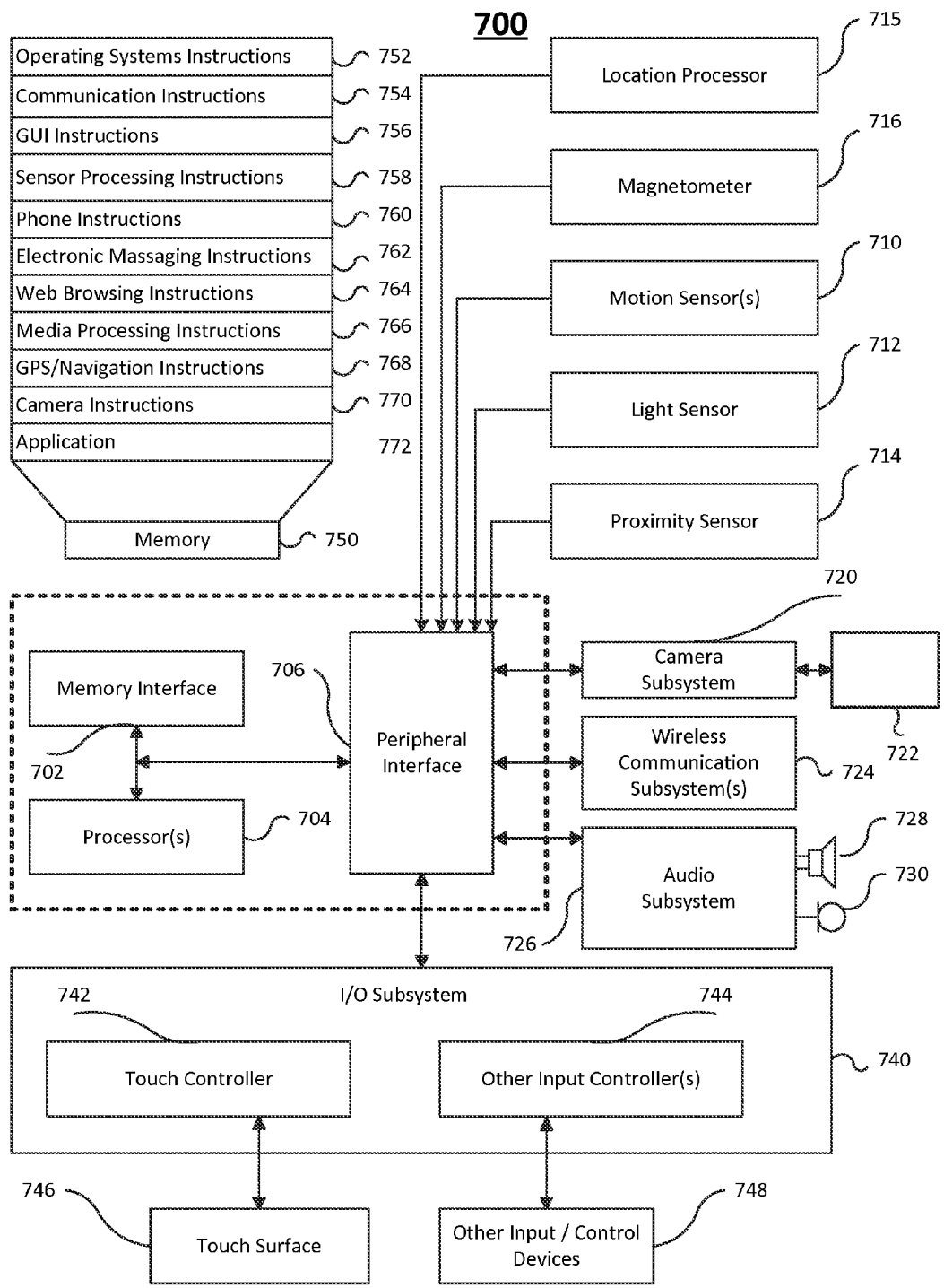
FIG. 7 illustrates a mobile device architecture that may be utilized to implement the various features and processes described herein.

FIG. 7 illustrates a mobile device architecture that may be utilized to implement the various features and processes described herein. Architecture 700 can be implemented in any number of portable devices including but not limited to smart phones, electronic tablets, and gaming devices. Architecture 700 as illustrated in FIG. 7 includes memory interface 702, processors 704, and peripheral interface 706. Memory interface 702, processors 704 and peripherals interface 706 can be separate components or can be integrated as a part of one or more integrated circuits. The various components can be coupled by one or more communication buses or signal lines.

Processors 704 as illustrated in FIG. 7 is meant to be inclusive of data processors, image processors, central processing unit, or any variety of multi-core processing devices. Any variety of sensors, external devices, and external subsystems can be coupled to peripherals interface 706 to facilitate any number of functionalities within the architecture 700 of the exemplar mobile device. For example, motion sensor 710, light sensor 712, and proximity sensor 714 can be coupled to peripherals interface 706 to facilitate orientation, lighting, and proximity functions of the mobile device. For example, light sensor 712 could be utilized to facilitate adjusting the brightness of touch surface 746. Motion sensor 710, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 706, such as a temperature sensor, a biometric sensor, or other sensing device to facilitate corresponding functionalities. Location processor 715 (e.g., a global positioning transceiver) can be coupled to peripherals interface 706 to allow for generation of geo-location data thereby facilitating geo-positioning. An electronic magnetometer 716 such as an integrated circuit chip could in turn be connected to peripherals interface 706 to provide data related to the direction of true magnetic North whereby the mobile device could enjoy compass or directional functionality. Camera subsystem 720 and an optical sensor 722 such as a charged coupled device (CCD) or a complementary metal-oxide semiconductor (CMOS) optical sensor can facilitate camera functions such as recording photographs and video clips.

Communication functionality can be facilitated through one or more communication subsystems 724, which may include one or more wireless communication subsystems. Wireless communication subsystems 724 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 724 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 724 may include hosting protocols such that the device may be configured as a base station for other wireless devices. Communication subsystems can also allow the device to synchronize with a host device using one or more protocols such as TCP/IP, HTTP, or UDP.

Audio subsystem 726 can be coupled to a speaker 728 and one or more microphones 730 to facilitate voice-enabled functions. These functions might include voice recognition, voice replication, or digital recording. Audio subsystem 726 in conjunction may also encompass traditional telephony functions.

I/O subsystem 740 may include touch controller 742 and/or other input controller(s) 744. Touch controller 742 can be coupled to a touch surface 746. Touch surface 746 and touch controller 742 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 746 may likewise be utilized. In one implementation, touch surface 746 can display virtual or soft buttons and a virtual keyboard, which can be used as an input/output device by the user.

Other input controllers 744 can be coupled to other input/control devices 748 such as one or more buttons, rocker switches, thumb-wheels, infrared ports, USB ports, and/or a pointer device such as a stylus. The one or more buttons (not shown) can include an up/down button for volume control of speaker 728 and/or microphone 730. In some implementations, device 700 can include the functionality of an audio and/or video playback or recording device and may include a pin connector for tethering to other devices.

Memory interface 702 can be coupled to memory 750. Memory 750 can include high-speed random access memory or non-volatile memory such as magnetic disk storage devices, optical storage devices, or flash memory. Memory 750 can store operating system 752, such as Darwin, RTXC, LINUX, UNIX, OS X, ANDROID, WINDOWS, or an embedded operating system such as VxWorks. Operating system 752 may include instructions for handling basic system services and for performing hardware dependent tasks. In some implementations, operating system 752 can include a kernel.

Memory 750 may also store communication instructions 754 to facilitate communicating with other mobile computing devices or servers. Communication instructions 754 can also be used to select an operational mode or communication medium for use by the device based on a geographic location, which could be obtained by the GPS/Navigation instructions 768. Memory 750 may include graphical user interface instructions 756 to facilitate graphic user interface processing such as the generation of an interface; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes, camera instructions 770 to facilitate camera-related processes and functions; and instructions 772 for any other application that may be operating on or in conjunction with the mobile computing device. Memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for displaying next application suggestions on a user device, the method comprising:
storing information regarding an application in memory, wherein the application is associated with a set of one or more next applications that had each been opened on the user device following a previous opening of the application;
receiving a customization input through a user interface of the user device, the received customization input indicating an edit to the set of one or more next applications associated with the application, the received customization input including an application selection input identifying an additional application, the additional application being added to the set of one or more next applications;
receiving a first user input selecting the application, wherein the first user input is received at the user interface of the user device; and
executing instructions stored in the memory, wherein the execution of the instructions by a processor:
executes the selected application on the user device,
retrieves next application data associated with the selected application from the information stored in the memory, wherein the retrieved next application data includes the set of one or more next applications associated with the selected application as edited by the customization input; and
generates a display of the edited set of one or more next applications on the user interface, wherein each displayed next application in the edited set is selectable by a user.

2. The method of claim 1, further comprising receiving a second user input selecting a second application from the displayed and edited set of one or more next applications, wherein execution of the instructions by the processor further opens the second selected application.

3. The method of claim 1, wherein the execution of the instructions by the processor further counts how many times each of the edited set of one or more next applications was opened on the user device immediately following the previous openings of the selected application, wherein the count is maintained in the memory.

4. The method of claim 3, wherein the generated display of the edited set of one or more next applications is ranked based on the count of each of the edited set of one or more next applications.

5. The method of claim 4, wherein the display of the edited set of one or more next applications is sorted in accordance with the ranking.

6. The method of claim 1, wherein the display of the edited set of one or more next applications is displayed as a toolbar on the user interface.

7. The method of claim 1, wherein the display of the edited set of one or more next applications is displayed on the user interface as user-selectable icons, wherein each icon corresponding to one of the edited set of one or more next applications.

8. The method of claim 1, wherein the feee4e-1se application selection input includes dragging an icon corresponding to the additional application to the display of the edited set of one or more next applications.

9. The method of claim 7, wherein the user interface is a touchscreen, and wherein the user-selectable icons are soft keys selectable via touch gesture.

10. The method of claim 1, wherein the display of the edited set of one or more next applications is generated based on the next application data and user settings.

11. The method of claim 10, wherein the user settings include a number of suggested applications to be included in the display of the edited set of one or more next applications.

12. The method of claim 1, wherein the next application data is stored on a local application search database.

13. The method of claim 1, wherein the next application data is stored remotely on a share application search server.

14. The method of claim 1, wherein the next application data is retrieved from a third party network.

15. The method of claim 1, wherein the user device is a mobile device.

16. An apparatus for displaying next application suggestions on a user device, the apparatus comprising:

memory that stores information regarding an application, wherein the application is associated with a set of one or more next applications that had each been opened on the user device by a user following a previous opening of the application;

a user interface that:

receives a customization input indicating an edit to the set of one or more next application associated with the application, the received customization input including an application selection input identifying an additional application, the additional application being added to the set of one or more next applications, and receives a first user input selecting the application;

a processor that executes instructions stored in the memory, wherein the execution of the instructions by the processor:

executes the selected application on the user device, and retrieves next application data associated with the selected application from the information stored in the memory, wherein the retrieved next application data includes the set of one or more next applications associated with the selected application as edited by the customization input regarding added or deleted applications;

wherein the user interface displays a generated display of the edited set of the one or more next applications, wherein each displayed next application in the edited set is selectable by the user.

17. The apparatus of claim 16, wherein the user interface further receives a second user input selecting a second application from the displayed and edited set of one or more applications, and wherein the processor executes further instructions to open the second selected application.

18. The apparatus of claim 16, wherein the processor further executes the instructions to count how many times each of the edited set of one or more next applications was opened on the user device immediately following the previous openings of the selected application, and wherein the memory further maintains the count.

19. A non-transitory computer-readable storage medium, having embodied thereon a program executable by a processor to perform a method for displaying next application suggestions on a user device, the method comprising:

storing information regarding an application, wherein the application is associated with a set of one or more next applications that had each been opened on the user device by a user following a previous opening of the application;

receiving a customization input through a user interface indicating an edit to the set of one or more next applications associated with the application, the received customization input including an application selection input identifying an additional application, the additional application being added to the set of one or more next applications;

receiving user input selecting the application;

executing the selected application on the user device;

retrieving next application data associated with the selected application from the information stored in memory, wherein the retrieved next application data includes the set of one or more next applications associated with the selected application as edited by the customization input; and generating a display of the edited set of the one or more next applications, wherein each displayed next application in the edited set is selectable by the user.

\* \* \* \* \*